Patented Nov. 25, 1941

2,263,994

UNITED STATES PATENT OFFICE 2,263,994

DISAZO DYESTUFF

Arthur Howard Knight, Blackley, Manchester, England, assignor to Imperial Chemical Industries Limited, a corporation of Great Britain No Drawing. Application November 15, 1939, Serial No. 304,597. In Great Britain December 22, 1938

5 Claims. (Cl. 260—160)

The present invention relates to new disazo dyestuffs.

According to the invention we make new symmetrical disazo dyestuffs by coupling tetrazotised diaminoalkyl- or benzyl- anilides of certain dicarboxylic acids, as defined below, with two molecular proportions of a coupling component, which component is a sulphoarylpyrazolone, a naphtholsulphonic acid, an aminonaphtholsulphonic acid or an N-derivative of an aminonaphtholsulphonic acid, also as defined below.

The diaminoalkyl- or benzyl- anilides of certain dicarboxylic acids referred to above are those of either of the two general formulae $NH_2.C_6H_4.NR.CO.CO.NR.C_6H_4.NH_2$ and $NH_2.C_6H_4.NR.CO.C_nH_{2n}.CO.NR.C_6H_4.NH_2$ in which $C_nH_{2n}$ stands for an aliphatic hydrocarbon residue which may be either a straight or branched chain, $n$ stands for a whole number greater than 1 and not greater than 10, R stands for an alkyl radical with not more than 5 carbon atoms or for benzyl, the amino groups may be attached to any position in the phenyl nuclei (but to the same positions in each), and the phenyl nuclei may carry one or more other substituents, for example, halogen atoms and/or methyl and alkoxy groups. The benzyl radicals, if present, also may carry one or more such substituents.

The N-derivative of aminonaphtholsulphonic acids which are used as phenyl, acyl and alkyl derivatives, such as are used as azo dyestuff components.

The new dyestuffs can be employed for colouring animal fibres, e. g. wool and silk.

The dyeings on wool, from a neutral or acid bath, are characterised in general by good fastness to washing, milling and perspiration.

Most of the dyestuffs yield shades of yellow or red or approximating to these.

The invention is illustrated, but not limited, by the following examples in which the parts are by weight.

Example 1

43.8 parts of sebacic-di-(4-amino-1-N-ethyl-anilide) of formula $NH_2(p).C_6H_4.NC_2H_5.CO$ $C_8H_{16}CO.NC_2H_5.C_6H_4(p)NH_2$ (made as described below) are dissolved in 300 parts of water containing 50 parts of 36% hydrochloric acid and the solution cooled to 5°–10° C. A solution of 13.8 parts of sodium nitrite in 100 parts of water is then added. Tetrazotisation is rapid and, when complete, the tetrazo solution so obtained is slowly added with good stirring to a cooled (0°–5° C.) aqueous solution of 69 parts of the sodium salt of 1-(2':5'-dichloro-4'-sulphophenyl)-3-methyl-5-pyrazolone in 500 parts of water containing 42 parts of anhydrous sodium carbonate and 75 parts of sodium chloride. Coupling is rapid and when complete the new dyestuff is filtered off and dried. It dissolves in water with a yellow colour and dyes wool in greenish-yellow shades from a dyebath containing 2% ammonium acetate. The dyeings have excellent fastness to milling, severe washing, and light.

Sebacic di-(4-amino-1-N-ethylanilide) is made by reacting one molecular proportion of sebacyl chloride with two molecular proportions of 4-nitro-N-ethylaniline in toluene to give sebacic di-(4-nitro-1-N-ethylanilide), M. P. 109° C., and reducing the latter with iron and hydrochloric acid in alcoholic solution. It melts at 117–118° C.

Example 2

43.8 parts of sebacic di-(4-amino-1-N-ethylanilide) are tetrazotised as in Example 1.

The tetrazo solution is added to a cooled solution (0°–5° C.) of 81 parts of the disodium salt of 1-acetyl-amino-8-naphthol-3:6-disulphonic acid in 500 parts of water containing 42 parts of anhydrous sodium carbonate. Coupling is rapid and, when complete, the new dyestuff is precipitated by cautious addition of sodium chloride. The dyestuff is then isolated and dried. It dissolves in water with a red colour and dyes wool from a dyebath containing 2% of sulphuric acid and 10% of Glauber's salt in red shades of very good fastness to washing and milling, and good fastness to light.

Example 3

21.9 parts of sebacic di-(4-amino-1-N-ethylanilide) are tetrazotised by the method described in Example 1. To the tetrazo solution so-obtained is added slowly a neutral solution of 26.1 parts of the sodium salt of 2-amino-8-naphthol-6-sulphonic acid.

The mixture is stirred at 5–10° C., and an aqueous solution of sodium acetate is dropped in at such a rate as to keep the coupling just neutral to Congo red paper. After some hours' stirring coupling is complete. The dyestuff is isolated and dried. It forms a dark brown powder which dissolves in water with a red colour. It dyes wool in red shades of very good fastness to washing and milling.

Example 4

32.6 parts of oxalic di-(4-amino-1-N-ethylanilide) made as described below, are dissolved in a mixture of 350 parts of water and 50 parts of 36% hydrochloric acid and to the resulting solution, cooled to 10° C., is added a solution of 13.8 parts of sodium nitrite in 100 parts of water. The tetrazo solution so-obtained is added with good stirring to a cooled (0°–5° C.) aqueous solution of 55.2 parts of the sodium salt of 1-(4'-sulphophenyl)-3-methyl-5-pyrazolone in 700 parts of water, to which have been added 42 parts of anhydrous sodium carbonate and 160 parts of sodium chloride. Coupling is rapid and the dyestuff is then precipitated by adding a further 160 parts of sodium chloride and filtered off and dried.

It dyes wool from an acid bath in reddish-yellow shades of very good fastness to milling, perspiration, sulphur stoving and light, and good fastness to severe washing.

Oxalic di-(4-amino-1-N-ethylanilide) is obtained by condensing one molecular proportion of oxalyl chloride with two molecular proportions of 4-nitro-1-N-ethylaniline in toluene to give oxalic di-(4-nitro-1-N-ethylanilide) (M. P. after crystallisation from glacial acetic acid=203°–204° C.), and reducing the dinitro compound with iron and hydrochloric acid in butyl alcohol solution. It has M. P. 172°–174° C.

*Example 5*

35.4 parts of succinic di-(4-amino-1-N-ethylanilide) are tetrazotised as described in Example 4 for the corresponding amount of oxalic di-(4-amino-1-N-ethylanilide). The tetrazo solution is filtered if necessary and is then added with good stirring to a cooled (0°–5° C.) solution of 49.2 parts of the sodium salt of 1-hydroxy-naphthalene-4-sulphonic acid in 800 parts of water, to which have also been added 42 parts of anhydrous sodium carbonate and 160 parts of sodium chloride. The new dyestuff so-obtained is filtered off and dried.

It dyes wool from an acid bath in scarlet red shades of good fastness to washing, milling, sulphur stoving, perspiration and light.

Succinic di-(4-amino-1-N-ethylanilide) is obtained by reacting one molecular proportion of succinic acid, 2 molecular proportions of 4-nitroethylaniline and 0.8 molecular proportions of phosphorus trichloride in dry toluene at the boil to give succinic di-(4-nitro-1-ethylanilide) (M. P. 227° C.), and reducing the latter with iron and hydrochloric acid in ethyl alcohol solution. It has M. P. 227° C.

*Example 6*

This is as Example 5 but there are used instead of 35.4 parts of succinic di-(4-amino-1-N-ethylanilide) 42.4 parts of azelaic di-(4-amino-1-N-ethylanilide).

A dyestuff is obtained which dyes wool from an acid bath in scarlet shades of very good fastness to milling and perspiration and good fastness to washing and light.

A dyestuff having similar properties is obtained by using the methylanilide instead of the above ethylanilide.

Azelaic di-(4-amino-1-N-ethylanilide) is obtained in a similar way to the above corresponding succinic dianilide, by using azelaic acid instead of succinic acid. Azelaic di-(4-nitro-1-N-ethylanilide) has M. P. 79°–81° C. The corresponding diamine is an oil at ordinary temperatures and is conveniently kept as an aqueous solution of its dihydrochloride.

Azelaic di-(4-amino-1-N-methylanilide) is obtained in a similar way, using 4-nitro-1-N-methylaniline instead of 4-nitro-1-N-ethylaniline.

*Example 7*

43.8 parts of sebacic di-(4-amino-1-N-ethylanilide) are tetrazotised as in Example 1 and the tetrazo solution coupled with 49.2 parts of the sodium salt of 1-hydroxy-naphthalene-5-sulphonic acid in the presence of excess of sodium carbonate. The new dyestuff is isolated by salting and filtering. It is then dried.

It dyes wool from an acid dyebath or from a dyebath containing 2% of ammonium acetate (on the weight of material) in red shades of very good fastness to severe washing, milling, sulphur stoving and perspiration, and good fastness to light.

The invention is also illustrated by the dyestuffs listed in the following table:

| Example No. | Tetrazo component (1 molecular proportion) | Coupling component (2 molecular proportions) | Shade given by dyestuff on wool |
| --- | --- | --- | --- |
| 8 | Azelaic di-(4-amino-1-N-ethylanilide) | 2-naphthol-6:8-disulphonic acid | Bright yellowish-orange. |
| 9 | Sebacic di-(4-amino-1-N-ethylanilide) | 2-acetylamino-5-naphthol-7-sulphonic acid. | Orange. |
| 10 | ----do---- | 2-naphthol-8-sulphonic acid | Yellowish-orange. |
| 11 | Oxalic di-(4-amino-2-N-benzyltoluidide) | 1-(4-sulphophenyl)-3-methyl-5-pyrazolone. | Reddish-yellow. |
| 12 | Oxalic di-(4-amino-1-N-ethylanilide) | 1-naphthol-3:6-disulphonic acid | Yellowish-scarlet. |
| 13 | αβ-Dimethylsuccinic di-(4-amino-1-N-ethylanilide). | 1-naphthol-4-sulphonic acid | Scarlet. |
| 14 | Succinic di-(4-amino-1-N-ethylanilide) | 2-N-benzoyl-β-hydroxy-ethyl-amino-8-naphthol-6-sulphonic acid. | Reddish-brown. |
| 15 | Sebacic di-(4-amino-2-N-benzyltoluidide) | 1-acetylamino-8-naphthol 3:6-disulphonic acid. | Bluish-red. |
| 16 | ----do---- | 2-naphthol-6:8-disulphonic acid | Yellowish-orange. |

Oxalic di-(4-amino-2-N-benzyltoluidide) is obtained by condensing one molecular proportion of oxalylchloride with two molecular proportions of 4-nitro-2-N-benzyltoluidine in boiling toluene to give oxalic di-(4-nitro-2-N-benzyltoluidide) M. P. 168°–170° C., and reducing the latter with iron and hydrochloric acid in butyl alcohol solution. It is conveniently isolated as its dihydrochloride.

αβ-Dimethyl succinic di-(4-amino-1-N-ethylanilide) is obtained from αβ-dimethyl succinyl chloride and 4-nitro 1-N-ethylaniline by a similar process to that described above for succinic di-(4-amino-1-N-ethylanilide).

The diamines used as tetrazo components for Examples 11 and 15 above are obtained by reacting one molecular proportion of the acid dichloride with two molecular proportions of the appropriate nitroarylamine in dry toluene at the boil and reducing the di-(nitroarylamides) so-obtained with iron and hydrochloric acid in boiling ethyl alcohol.

The invention is further illustrated by the following examples:

Example 17

53 parts of adipic di-(4-amino-2-N-benzyltoluidide) of formula

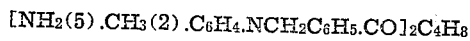

are dissolved in a mixture of 480 parts of water and 50 parts of 36% hydrochloric acid and the solution cooled to 5°–10°. A solution of 13.8 parts of sodium nitrite in 100 parts of water is then added. Tetrazotisation is rapid, the tetrazo compound being in solution. The solution, after filtration if necessary, is added with good stirring to a cooled solution (0°–5° C.) of 55.2 parts of the sodium salt of 1-(4'-sulphophenyl)-3-methyl-5-pyrazolone in 800 parts of water, to which have been added 42 parts of anhydrous sodium carbonate and 160 parts of sodium chloride. The new dyestuff is isolated by heating its suspension to 40°–45° C. and filtering. It is then dried. It forms a reddish-yellow powder, which dissolves in water with a reddish-yellow colour and in concentrated sulphuric acid with a greenish-yellow colour.

It dyes wool from an acid bath in reddish-yellow shades. The dyeings have excellent fastness to washing, milling, sulphur stoving, perspiration and light.

If, in the above example, instead of 55.2 parts of the sodium salt of 1-(4'-sulphophenyl)-3-methyl-5-pyrazolone, there are used 69 parts of the sodium salt of 1-(2':5'-dichloro-4'-sulphophenyl)-3-methyl-5-pyrazolone, a dyestuff yielding greener shades of yellow on wool is obtained, the dyeings of which have very good fastness to washing, milling, sulphur stoving and light. The dyestuff may be applied either from an acid dyebath or from a dyebath containing 2% of ammonium acetate (on the weight of material to be dyed).

Example 18

38.2 parts of adipic di-(4-amino-1-N-ethylanilide) are tetrazotised by the method employed in Example 4. The solution of the tetrazo compound so-obtained is added with good stirring to a cooled aqueous solution of 69 parts of the sodium salt of 1-(2':5'-dichloro-4'-sulphophenyl)-3-methyl-5-pyrazolone in 800 parts of water containing excess of sodium carbonate and 160 parts of sodium chloride. The new dyestuff isolated by heating the suspension so-obtained to 40°–45° C., adding more sodium chloride if necessary, and filtering. It is then dried.

It is reddish-yellow in colour and dissolves in water with a reddish-yellow colour and in concentrated sulphuric acid with a greenish-yellow colour.

It dyes wool from an acid bath in greenish-yellow shades of very good fastness to washing, milling, sulphur stoving, perspiration and light.

If in the above process, instead of 38.2 parts of adipic di-(4-amino-1-N-ethylanilide) there are employed 43.8 parts of adipic di-(4-amino-1-N-$n$-butylanilide) another greenish-yellow dyestuff is obtained, which has very similar properties.

Example 19

50.2 parts of adipic di-(4-amino-1-N-benzylanilide) are dissolved in a mixture of 480 parts of water and 50 parts of 36% hydrochloric acid by heating to 50°–55° C. The solution so-obtained is then cooled to 5°–10° C. and a solution of 13.8 parts of sodium nitrite in 100 parts of water added. Tetrazotisation is rapid. The tetrazo solution is filtered from any insoluble matter and added to a well stirred cooled (0°–5° C.) solution of 70 parts of the disodium salt of 2-naphthol-6:8-disulphonic acid in 800 parts of water, to which have been added 42 parts of anhydrous sodium carbonate and 160 parts of sodium chloride, stirring is continued until coupling is complete (several hours). The new dyestuff is completely precipitated by the addition of a further 160 parts of sodium chloride, is filtered off and dried.

It dyes wool from an acid bath in bright orange shades. The dyeings have very good fastness to washing, milling, perspiration and light.

If, in the above process, instead of 50.2 parts of adipic di-(4-amino-1-N-benzylanilide) there is employed the same amount of adipic di-(3-amino-1-N-benzylanilide) a dyestuff is obtained which dyes wool from an acid bath in bright yellowish-orange shades. The dyeings have similar fastness properties.

Example 20

56.2 parts of adipic di-(4-amino-2-N-benzylanisidide) are tetrazotised in 500 parts of water containing 50 parts of 36% hydrochloric acid by the addition of a solution of 13.8 parts of sodium nitrite in 100 parts of water. The solution of the tetrazo compound is filtered, if necessary, and added to a cooled (0°–5° C.) solution of 60.6 parts of the sodium salt of 2-acetylamino-5-hydroxynaphthalene-7-sulphonic acid in 800 parts of water containing 160 parts of sodium chloride and excess sodium carbonate. When coupling is complete 80 parts of sodium chloride are added and the new dyestuff filtered off and dried. It dyes wool from an acid dyebath in red shades of very good fastness to washing and sulphur stoving.

The invention is further illustrated by the dyestuffs listed in the following table:

| Example No. | Tetrazo component (1 molecular proportion) | Coupling component (2 molecular proportions) | Shade given by dyestuff on wool |
|---|---|---|---|
| 21 | Adipic di-(4-amino-1-N-$n$-butylanilide) | 1-(4'-sulphophenyl)-3-methyl-5-pyrazolone. | Reddish-yellow. |
| 22 | Adipic di-(5-amino-2-N-benzylanisidide) | 1-(2'-chloro-5'-sulphophenyl)-3-methyl-5-pyrazolone. | Do. |
| 23 | ——do—— | 1-(2':5'-dichloro-4'-sulphophenyl)-3-methyl-5-pyrazolone. | Do. |
| 24 | Adipic di-(4-amino-2-N-benzylanisidide) | ——do—— | Do. |
| 25 | Adipic di-(2-amino-1-N-ethylanilide) | ——do—— | Greenish-yellow. |
| 26 | Adipic di-(4-amino-1-N-benzylanilide) | ——do—— | Do. |
| 27 | Adipic di-(3-amino-1-N-benzylanilide) | ——do—— | Do. |
| 28 | Adipic di-(4-amino-2-N-p-chlorobenzyltoluidide). | ——do—— | Do. |
| 29 | Adipic di-(4-amino-1-N-ethylanilide) | 1-(4'-sulphophenyl)-3-methyl-5-pyrazolone. | Reddish-yellow. |
| 30 | Adipic di-(4-amino-2-N-benzyltoluidide) | 1-(4'-sulphophenyl)-5-pyrazolone-3-carboxylic acid. | Very reddish-yellow. |

| Example No. | Tetrazo component (1 molecular proportion) | Coupling component (2 molecular proportions) | Shade given by dyestuff on wool |
|---|---|---|---|
| 31 | Adipic di-(4-amino-2-N-benzylanisidide) | 1-(4'-sulphophenyl)-3-methyl-5-pyrazolone. | Reddish-yellow. |
| 32 | ....do.... | 1-(3'-sulphophenyl)-3-methyl-5-pyrazolone. | Do. |
| 33 | Adipic di-(4-amino-2-N-benzyltoluidide) | 1-(4'-chloro-2'-sulphophenyl)-3-methyl-5-pyrazolone. | Yellow. |
| 34 | Adipic di-(3-amino-1-N-benzylanilide) | 1-(4'-sulphophenyl)-3-methyl-5-pyrazolone. | Reddish-yellow. |
| 35 | Adipic di-(4-amino-1-N-benzylanilide) | 1-p-toluenesulphonyl-amino-8-naphthol-3:6-disulphonic acid. | Crimson. |
| 36 | ....do.... | 1-p-toluenesulphonylamino-8-naphthol-4:6-disulphonic acid. | Bluish-red. |
| 37 | ....do.... | 1-acetylamino-8-naphthol-6-sulphonic acid. | Red. |
| 38 | Adipic di-(5-amino-2-N-benzylanisidide) | 1-p-toluenesulphonylamino 8-naphthol-3:6-disulphonic acid. | Very bluish-red. |
| 39 | Adipic di-(4-amino-2-N-benzylanisidide) | 1-naphthol-4-sulphonic acid | Very yellowish-red. |
| 40 | Adipic di-(3-amino-1-N-benzylanilide) | ....do.... | Reddish-orange. |
| 41 | ....do.... | 2-phenylamino-8-naphthol-6-sulphonic acid. | Brown. |
| 42 | Adipic di-(4-amino-1-N-ethylanilide) | 2-p-methoxyphenylamino-8-naphthol-6-sulphonic acid. | Do. |

The tetrazo components employed in Examples 15–40 may be made by the processes of co-pending application in Great Britain Number 15,219 filed May 22, 1939, and U. S. application Serial No. 330,208 filed April 17, 1940.

I claim:

1. A symmetrical soluble azo dyestuff represented by the formula

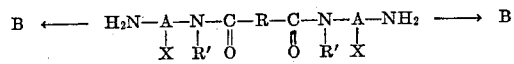

in which the group

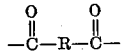

is the radical of a dicarboxylic acid of a group consisting of oxalic acid and aliphatic dicarboxylic acids represented by the formula $(C_nH_{2n})-(COOH)_2$ in which $n$ is an integer greater than 1 and not greater than 8; R' is one of a group consisting of alkyl having 1 to 4 carbons, benzyl, halo-benzyl, methyl-benzyl, halo-methyl-benzyl and alkoxy-benzyl; each A is a benzene nucleus; each X is at least one member of a group consisting of hydrogen, halogen, alkyl having 1 to 4 carbons and alkoxy; and each B is an azo dye coupling component of the group consisting of a sulfoarylpyrazolone, a naphthol sulfonic acid, an amino-naphthol sulfonic acid and an N-derivative of an amino-naphthol sulfonic acid.

2. A dyestuff of claim 1 in which the group

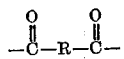

is the radical of adipic acid.

3. A dye which in its acid form is represented by the formula

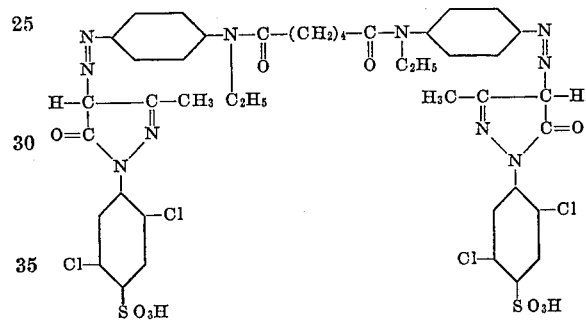

4. A dye which in its acid form is represented by the formula

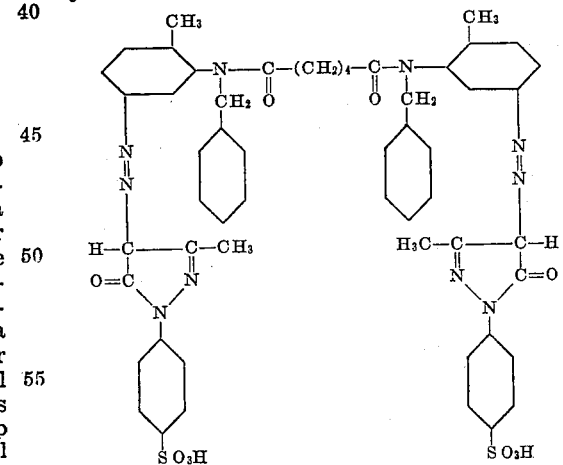

5. A dye which in its acid form is represented by the formula

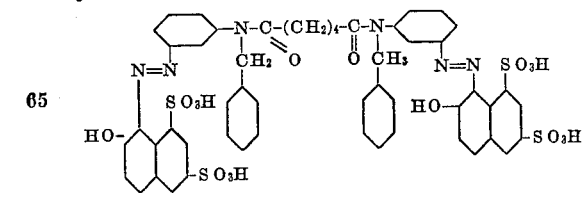

ARTHUR HOWARD KNIGHT.